United States Patent
Kozlowski

(10) Patent No.: US 8,564,398 B2
(45) Date of Patent: Oct. 22, 2013

(54) SIGNAL STRENGTH DETECTION FOR IDENTIFYING INTERFERENCE WITH COMMUNICATIONS CONTROLLER AND CONTROLLED DEVICES

(75) Inventor: Anthony Kozlowski, Monument, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 1119 days.

(21) Appl. No.: 12/511,755

(22) Filed: Jul. 29, 2009

(65) Prior Publication Data

US 2011/0025453 A1    Feb. 3, 2011

(51) Int. Cl.
*G05B 23/02*    (2006.01)

(52) U.S. Cl.
USPC ......... 340/3.1; 340/1.1; 340/4.11; 340/12.22; 340/815.6; 348/14.05; 348/114; 348/211.99; 348/734; 455/3.03; 455/92

(58) Field of Classification Search
USPC ............... 340/3.1, 1.1, 4.11, 12.22, 426.13, 340/815.6; 455/63.1, 67.13, 3.03, 3.04, 455/67.11, 92, 151.1, 151.2, 352; 700/1–89; 348/14.03, 14.05, 114, 348/211.99, 734
See application file for complete search history.

(56) References Cited

U.S. PATENT DOCUMENTS

| | | | |
|---|---|---|---|
| 6,684,062 B1 * | 1/2004 | Gosior et al. | 455/73 |
| 6,823,199 B2 * | 11/2004 | Gough | 455/567 |
| 2004/0028003 A1 * | 2/2004 | Diener et al. | 370/319 |
| 2005/0152304 A1 * | 7/2005 | Park | 370/328 |
| 2005/0159109 A1 * | 7/2005 | Kivekas et al. | 455/67.11 |
| 2006/0258459 A1 * | 11/2006 | Davis et al. | 463/40 |
| 2007/0133994 A1 * | 6/2007 | Chi | 398/115 |

* cited by examiner

*Primary Examiner* — Steven Lim
*Assistant Examiner* — Sisay Yacob
(74) *Attorney, Agent, or Firm* — Seed IP Law Group PLLC

(57) ABSTRACT

Disclosed is an apparatus and method for identifying a source or sources of noise that interferes or potentially interfere with communications between a remote and a receiver. The noise source may be detected through the operation of a noise detector which is integrated as a component of a remote. The remote may be configured to operate in one of two modes. In a first mode, the remote may convey commands inputted by a user from the remote to the receiver. In a second mode the receiver may operate as a noise detector device.

20 Claims, 4 Drawing Sheets

SIGNAL STRENGTH DETECTION FOR IDENTIFYING INTERFERENCE WITH COMMUNICATIONS CONTROLLER AND CONTROLLED DEVICES

TECHNICAL FIELD

Implementations discussed herein are generally directed to an apparatus and method for detecting noise that may interfere with communications between a user input device and receiver.

BACKGROUND

Wireless remote control devices may be used to control such devices as satellite and/or cable television receivers. The remote control devices may be subject to ambient noise which interferes with the communication between the remote and its associated device, such as a receiver. In today's offices or households different levels or different sources of noise may be common. Sources of noise include, for example, cellular telephones and microwave ovens. These devices may emit electromagnetic radiation that interferes with the function of the wireless device. Mitigating the effect of ambient electromagnetic radiation may be problematic for a number of reasons. In one respect, the source of the electromagnetic radiation may be unknown. In another respect, the effect that noise on certain frequencies or frequency ranges will have on a particular communication device may be unknown.

SUMMARY

Implementations discussed herein are directed to an apparatus and method for identifying a source or sources of noise that interferes or potentially interfere with communications between a remote and a receiver. In one embodiment, the noise source is detected through the operation of a noise detector which is integrated as a component of a remote. The remote may be configured to operate in one of two modes. In a first mode, the remote may convey commands inputted by a user from the remote to the receiver. In a second mode the receiver may operate as a noise detector device. Specifically, output components such as an LED may be used to display a noise level indication as a user moves the remote throughout various positions in a given environment.

One embodiment is directed to a remote control device having a first mode of operation and a second mode of operation, the remote control device comprising: a signal transceiver configured to at least send wireless signals to a program service receiver, wherein in the first mode of operation the signal transceiver is configured to transmit signals that convey user commands to the program service receiver; a noise detection circuit in communication with the signal transceiver, wherein in the second mode of operation, the noise detector circuit is configured to detect electromagnetic noise in a surrounding area; and an output device in communication with the noise detection circuit, where in the second mode of operation the output device is configured to output information regarding electromagnetic noise detected by the noise detection circuit.

Another embodiment is directed to a system having a first mode of operation and a second mode of operation, the system comprising: a tuner configured to receive a program service transmission from a service provider; a signal transceiver configured to at least receive wireless signals from a remote, wherein in the first mode of operation the signal transceiver is configured to receiver signals that convey user commands from the remote; a noise detection circuit in communication with the signal transceiver, wherein in the second mode of operation, the noise detector circuit is configured to detect electromagnetic noise in a surrounding area; and an output device in communication with the noise detection circuit, where in the second mode of operation the output device is configured to convey information regarding electromagnetic noise detected by the noise detection circuit.

Still another embodiment is directed to a method of mitigating the effect of interference sources in a communication path between a program service receiver and a remote control device, comprising: detecting a presence of noise on a communication path between a program service receiver and a remote control device; receiving a plurality of noise level inputs at the remote control, the plurality of noise level inputs corresponding to a plurality of remote control locations; outputting a noise level indication as the remote control moves between the plurality of remote control positions; and in response to outputting the noise level indication, identifying a noise source.

DETAILED DESCRIPTION

Implementations discussed herein are directed to an apparatus and method for identifying a source or sources of noise that interferes or potentially interfere with communications between a remote and a receiver. In one embodiment, the noise source is detected through the operation of a noise detector which is integrated as a component of a remote. The remote may be configured to operate in one of two modes. In a first mode, the remote may convey commands inputted by a user from the remote to the receiver. In a second mode the receiver may operate as a noise detector device. Specifically, output components such as an LED may be used to display a noise level indication as a user moves the remote throughout various positions in a given environment.

Figure 1:
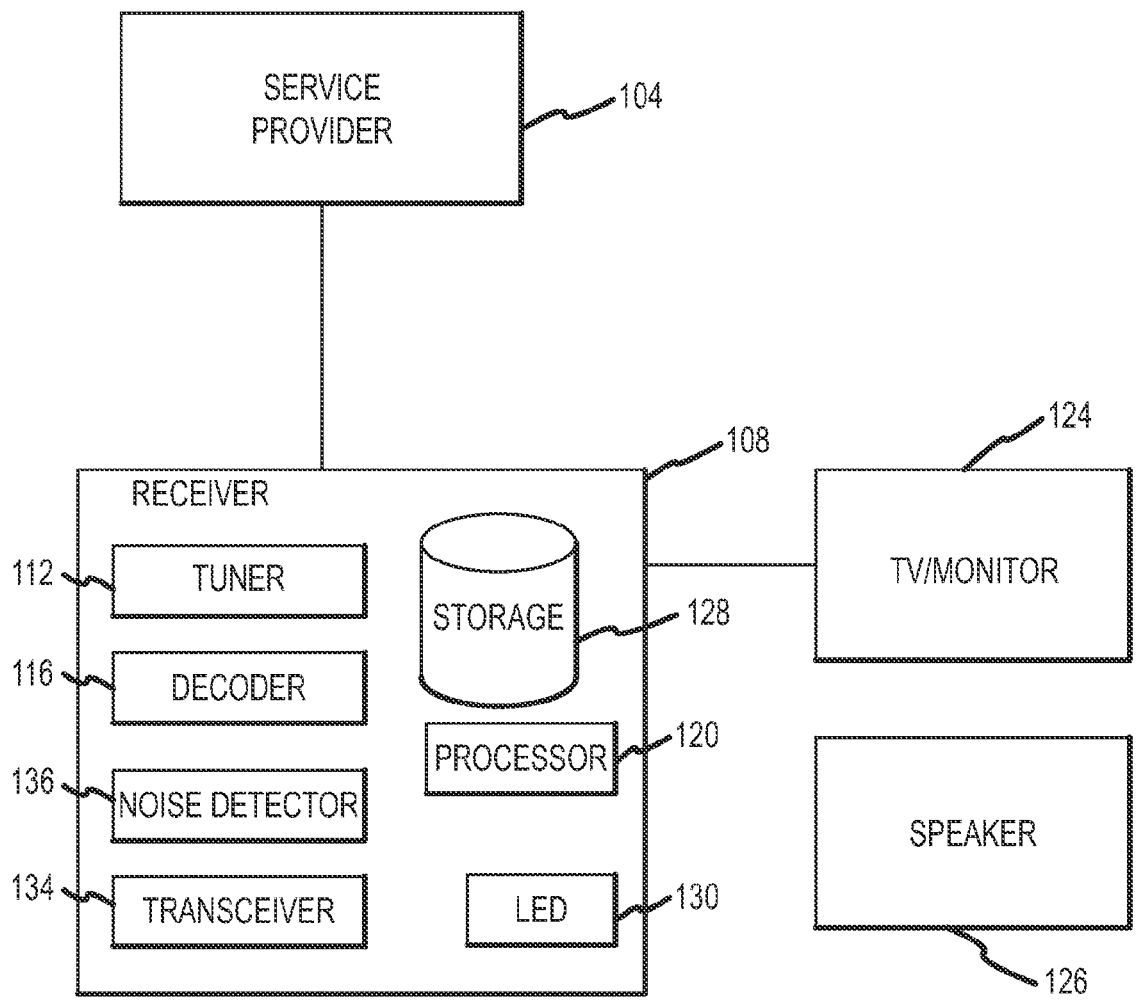
FIG. 1 is a schematic illustration of components and features associated with implementations discussed herein.
Figure 1:
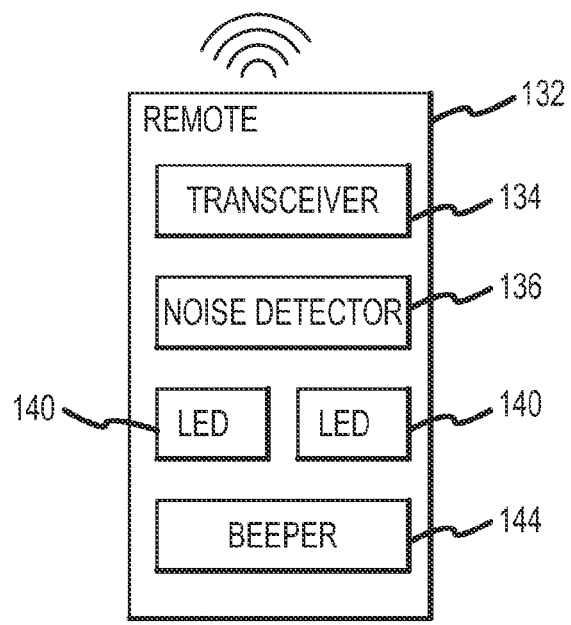

Implementations discussed herein may be employed with any electronic device, although specific implementations may be discussed with respect to a set-top box as shown in FIG. 1. It will be appreciated by those of ordinary skill in the art, however, that any electronic device may be equipped with a transceiver 134 and a processor 120 either added or appropriately configured to interact with the remote device 132, as described herein. Accordingly, embodiments may operate with (or be at least partially embodied in) such various devices as: a microwave oven or other appliance; television or other display device, including computer displays; hand-held device such as a telephone (mobile or otherwise), personal digital assistant or tablet computing device; stereo receiver or other piece of audiovisual equipment; computing device; and so on. Thus, references to a receiver should be understood to be illustrative insofar as any of the foregoing may be used instead of a receiver to detect noise and/or signal strength.

As used herein, a "receiver" may be any device capable of receiving video content included in a broadcast or other program service transmission from a service provider. For example, a receiver may include a set-top box, a cable box, general purpose computer, and so on. A receiver may also include a cable modem or raster that receives streaming video. As used herein, a "service provider" may include any entity that provides a program service transmission to a receiver such as, without limitation, a satellite television distributor, a direct television provider or a cable television company. It should be understood that the term "program service transmission" generally embraces not only satellite or terrestrial broadcasts and/or narrowcasts but also transmission of information across any wired or wireless transmission medium. Accordingly, a "program service transmission" encompasses transmission of information across a cable network (for example from a cable headend to cable receiver), an Internet or other computer-accessible medium (including a local area network, wide-area network, and so on), including Internet protocol television transmissions, a wireless network such as a radio frequency or infrared network, and so on.

FIG. 1 is a schematic illustration of a general operating environment showing components and features of embodiments discussed herein. FIG. 1 includes a service provider 104 that transmits or otherwise provides a program service transmission to a receiver 108. The receiver 108 may be associated with or located near an individual, business or other entity, user or subscriber that receives a program service transmission from the service provider 104. The program service transmission may be received through a subscription to the service. Generally the terms "user" and/or "subscriber" refer to an individual or company who receives a program service transmission. This may include those who have purchased a subscription to the program service transmission. Additionally, the terms "user" and/or "subscriber" may refer to individuals who have been given access to the program service transmission through promotional offers and/or other non-fee-based agreements.

A receiver 108 may include a tuner 112 operable to receive the program service transmission signal from the service provider 104 and a decoder 128 to decode the received signal. The decoder 116 may be programmed to decrypt or otherwise decode some or all of the received signal in accordance with purchases and selections made by a user. In connection with embodiments that operate in the context of a satellite television service, the service provider 104 may provide a program service transmission through an uplink center. The uplink center may include a transmitter or other equipment operable to transmit a modulated signal having data representing audio and/or visual content. The modulated signal may be received at a satellite, which in turn retransmits the modulated signal to be received at one or more terrestrial locations. The retransmitted signal may be received from the satellite at one or more satellite dishes, which are typically associated with one or more receivers.

Again, it should be noted that embodiments may operate with different product transmission services. Accordingly, although a satellite system is provided as an example of a program service transmission system, it should be understood that other networks or broadcasts for transmitting data may be used by alternative embodiments. For example, embodiments may be implemented in connection with a cable service. In this case, the service provider 104 and the receiver 108 may communicate over a communication path that includes various combinations of local and wide area networks and/or the Internet. In such embodiments, the receiver 108 may be configured to access a web site, a file transfer protocol (FTP) site, a file sharing system or site, and so on.

The receiver 108 may additionally include a processor 120 operable to run executable code in connection with various functions associated with the receiver 108. For example, the processor 120 may display graphics, images, animations or other content on a TV/monitor 124, such as a television (TV) or monitor. The receiver 108 and/or the TV/monitor may be associated with a speaker 126. In the case of receiving commands or other information relating to changes to the account status, the processor 120 may be further operable to initiate or facilitate transmission of one or more messages to the service provider 104. The processor 120 may be further operable to recall and display stored content, such as a purchased or recorded videos or programs.

The receiver 108 may include or be associated with a memory or other storage device 128, such as magnetic or optical storage. The storage device 128 may be operable to store data received from the decoded satellite signal. The storage device 128 may be volatile or non-volatile memory implemented using any suitable technique or technology such as, for example, random access memory (RAM), disk storage, flash memory, solid state and so on. The storage device 128 may be located within the receiver 108 or separately from the receiver 108. The storage device may removable in nature. The stored data set may include audio and/or visual content to be transmitted and displayed through the TV/monitor 124. Generally, audio visual content may include still images, video images, animation and/or audio. Portable Network Graphics (PNG) or other appropriate formats, such as for example, Tagged Image File Format (TIFF), Joint Photographic Experts Group (JPEG), Motion Picture Experts Group (MPEG)-2, MPEG-4 may be used to display an image or video. As a result commands or setting from a user, videos or other program may be stored locally in storage 128. Stored program may include for example recorded broadcasts, pay-per-view items and/or buffered portions of a live video broadcast.

The storage device 128 may additionally store an application, file, module or other data that is useable by the processor 120. As used herein, an application or module includes processor executable code that may be run to carry out one or more functions associated with the receiver 108. "Processor executable code" includes any computer-readable media or commands that may be ultimately interpreted by a processor, such as HTML or XML files that are rendered into user-viewable applications by an application executed by the processor.

The processor 120 may perform such tasks as executing commands received from a user. User commands may be sent to the receiver 108 through a user input device 156 such as remote or other wireless device. As used herein, a "user input device" may include any device operable to receive input from a user and to convey the input to the receiver 108. In one embodiment, the user input device 156 may be a hand-held device having a number of buttons or keys that when actuated by a user cause the user input device 156 covey information to the receiver 108 using a suitable communication means, such as an infrared signal. The user input device 156 may include a pointing device or functionality that allows the user to control the position of a cursor that is displayed on the TV/monitor 124. For example, the user input device 156 may include a track ball or glide plane that may be manipulated to control cursor movements. The user input device 156 may include a motion sensor or accelerometer that allows a user to control displayed items or graphics, such as a cursor, through movements of his or her hand or arm that cause a displacement of the user input device 156. It should be appreciated that other input devices such as a computer mouse or touch screen may be used and other communication means, wired or wireless, may be used. Information sent to the receiver 108 may include, for example, a command to change the displayed channel, a command to pause and/or rewind a displayed program, a command to record a particular program, a command to purchase a pay-per-view item. Commands sent to the receiver 108 may be entered through a dedicated display menu.

The user input device 132 may implement a home networking protocol such as "ZigBee". In this regard, the user input device 132 may communicate with the receiver 108 over a communication path that may include a number of channels. In one embodiment, three channels exist between the remote 132 and the receiver 108. However, it should be appreciated that this number of channels is by way of example and not limitation. Accordingly, embodiments may include a communication path having a greater or lesser amount of channels between the remote 132 and the receiver 108. By providing a number of possible channels over which the remote 132 and the receiver 108 may communicate, a greater protection against ambient electromagnetic noise may be achieved. Specifically, the remote 132 may selectively choose one of the available channels based on that channel's strength.

In determining a strength of a particular channel between the remote 132 and the receiver 108, noise detection techniques may be used. Specifically, the receiver 108 and/or the remote 132 may include a noise detector circuit 136. The noise detector circuit 136 is operable to measure an amount or level of noise that is in proximity to the noise detector 136. The noise detector 136 is operable to measure noise levels that exist at a particular frequency or at a particular range of frequencies. A noise detector circuit 136 associated with the receiver 108 may detect a noise level on one or more frequencies in the area of the receiver 108. Similarly, a noise detector circuit 136 in the remote 132 may measure a noise level present on one or more frequencies or frequency ranges in the area of the remote 132. A noise detector 136 may be specifically configured to detect noise on frequency ranges corresponding to those of the channels that exist between the remote 132 and the receiver 108. Accordingly, in order to make effective use of the communication path between the remote 132 and the receiver 108, the noise detector 136 may be used to determine which of the three available channels is the strongest. If the noise detector 136 detects noise on a first channel and not on a second channel, the remote 132 and receiver 108 may be configured to communicate over the second channel.

In order to further optimize communications between the remote 132 and the receiver 108, the remote 132 may operate in one of two modes. In a first mode of operation, the remote 132 may function to convey inputs or other commands to the receiver 108. As described above, these commands may include commands to change a broadcast channel, play a stored video, and so on. The remote 132 may communicate with the receiver 108 over a particular channel. The channel may be chosen automatically, based on noise measurements received from the noise detector 136. Specifically, the remote 132 and the receiver 108 may switch between available channels to optimize communication based on noise level measurements made from the noise detector(s) 136. The remote may include output devices such as light-emitting diodes (LEDs) 140 or tone generators such as a beeper 144. In the first mode of operation, these output devices function to convey information to the user in connection with the user's inputting of commands to be conveyed to the receiver 108.

In a second or diagnostic mode of operation, the receiver 108 may function to output information regarding noise level measurements made by the noise detector 136. The diagnostic mode may be used to determine the location of one or more noise sources. It may be the case that the room or other environment in which the receiver 108 and remote 132 operate includes sources of electromagnetic radiation that may interfere with communications. Examples of noise sources may include cellular telephones, cordless telephones, microwave ovens, and so on. Depending on the position or location of these noise sources, the noise source may inhibit or prevent wireless communication between the remote 132 and the receiver 108. In the diagnostic mode, the user may use the input device 132 to identify the location of the noise source. If the noise source is movable, the user may move the noise source to a location which is not problematic for communications between the remote 132 and the receiver 108. Alternatively, if the noise source is not movable, the user may decide to move the receiver 108 to a different location which does not result in interference from the noise source.

In the diagnostic mode, the output devices associated with the remote 132 may convey information regarding noise level measurements received from the noise detector 136. In one embodiment, an LED 140 may illuminate in response to a measurement of noise at a certain frequency or frequency range. In certain embodiments, an LED 140 may flash or blink at a particular rate indicative of a noise level. Specifically, as the remote moves closer to a noise source, the rate at which the LED 140 blinks may increase. Alternatively or in combination, the frequency of tones generated or the rate of beeps generated by the beeper 144 may increase as the remote 132 moves closer to a noise source.

It may be the case that specific firmware is used to allow the remote 132 to operate in the diagnostic mode. Accordingly, a firmware transfer may be executed on the remote 132 prior to or concurrently with placing the remote 132 in the diagnostic mode. The firmware transfer may be accomplished by placing the remote 132 in close proximity to the receiver 108. In this position, the receiver may effectively transfer a diagnostic firmware data set from the storage device 128 or other location to the remote 132. With the diagnostic firmware in place, the remote 132 may function in the second or diagnostic mode of operation. Following identification and removal of an offending noise source, the remote 132 may again be placed in proximity to the receiver 108 and an operational firmware data set may be transferred from the storage 128 to the remote 132. Following the operational firmware data set transfer, the remote 132 may function in the first mode of operation to process user commands.

Figure 2:
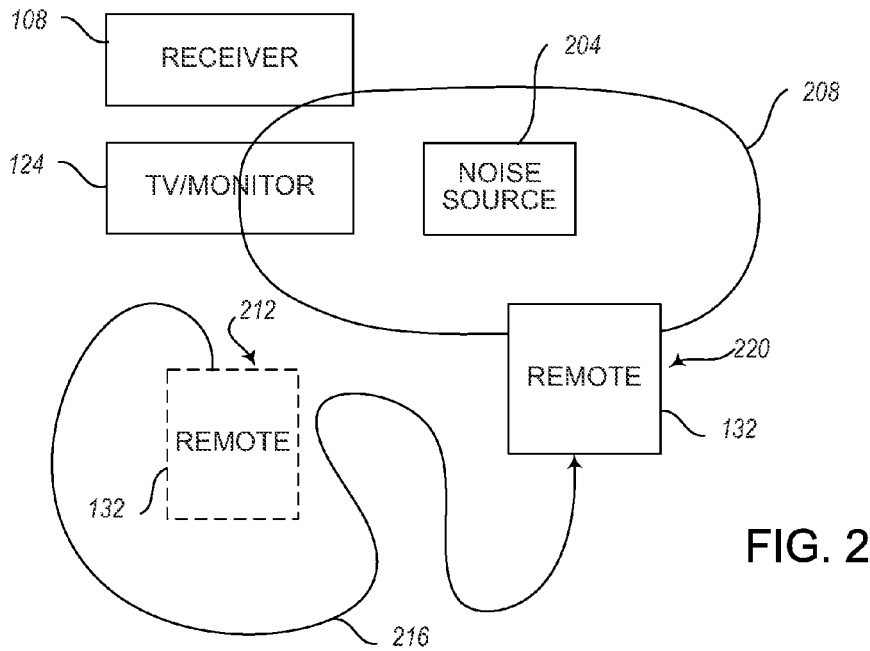
FIG. 2 is an illustration of a process of identifying a noise source.
Figure 3:
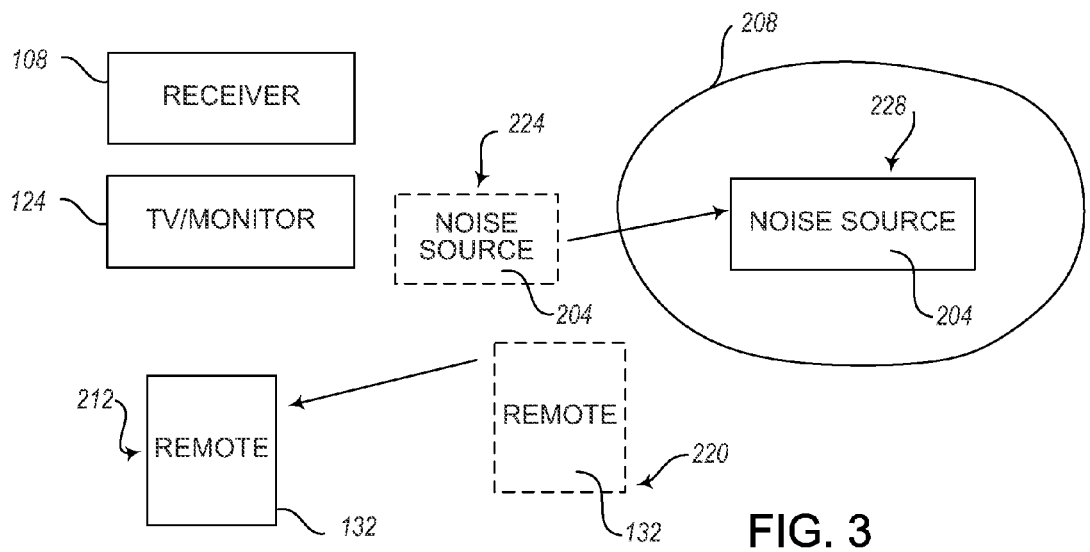
FIG. 3 is an illustration of another process of identifying a noise source.

FIG. 2 and FIG. 3 illustrate an example procedure for finding and removing an offending noise source. Referring first to FIG. 2, a receiver 108 is shown in association with a TV/monitor 124. The environment in which the receiver is located may additionally includes a noise source 204. The noise source 204 emits noise on certain frequencies within a range 208. As shown in FIG. 2, the range 208 overlaps the position of the receiver 108. With the noise source 204 in this position, the receiver 108 may not function to receive commands from a remote 132 or may function at a less than optimal level. It should be appreciated that the location of various components in FIG. 2 is not to scale. Specifically, an offending noise source 204 may be located within a few feet of the receiver 108 or in a different room, separated by a distance of several yards. Initially, the remote 132 may be located in a first position 212. The first position 212 may correspond to a location which is directly in front of the TV/monitor 124 or in a position which the remote would typically occupy in connection with a user sitting on a couch or otherwise being located in a position to watch the TV/monitor 124. With the remote 132 in a diagnostic mode, the remote 132 may be moved around a room by a user in an attempt to find the noise source 204. Specifically, a user may walk about the room in a random manner, indicated in FIG. 2 by the path 216. Following the path 216, the user may eventually move the remote 132 into a second position 220 within the range 208 of noise produced by the noise source 204. As the remote 132 approaches the noise source 204, output devices associated with the remote 132 may indicate a proximity to the noise source 204. Specifically, an LEDs 140 may flash at a faster rate and/or beepers 144 or other tone generators may emit sound at a higher pitch or frequency.

A user may be prompted to search for a noise source 204 for a variety of reasons. For instance, the remote 132 may be not functioning properly. Accordingly, the user may take the initiative to determine if a noise source is the cause of the remote's 132 malfunction. In other embodiments, the noise detector 136 may detect a high level of noise on one or more frequencies at the receiver 108. In this case, the user may be prompted through a display on the TV/monitor 124. Specifically, the processor 120 may output a message on the TV/monitor 124 to the user, indicating that the user should search for and identify noise sources that may be in proximity to the receiver 108. In this regard, the TV/monitor 124 may display a set of instructions which may be followed by the user to place the remote 132 in a diagnostic mode. Once the remote 132 is in a diagnostic mode, the user may follow additional instructions displayed on the TV/monitor 124 to thereby identify the noise source 204. In other embodiments, a user or installer of the receiver 108 may use the remote 132 proactively to determine the location of any noise sources at the time that the receiver 108 is first installed. In this way, future problems may be identified and eliminated prior to first use of the receiver 108. In certain embodiments, a process may be initiated to identify a noise source if noise is detected on at least one channel between the remote 132 and the receiver 108. Alternatively, the process of identifying a noise source may be initiated if noise is detected on all channels which exist between the remote 132 and the receiver 108.

As shown in FIG. 3, once a noise source 204 is identified, the noise source may be moved into a position that no longer interferes with communications between the remote 132 and the receiver 108. As shown in FIG. 3, the noise source 204 is moved from its initial position 224 to a new position 228. In the new position 228, the range 208 of noise emitted by the noise source 204 does not overlap with the receiver 108. Additionally, the remote 132 may be moved from its second position 220 back to its first position 212. In first position 212, the remote 132 may be used by the user to input commands which are then conveyed to the receiver 108. It is additionally noted that the process of eliminating the noise source 204 may include determining that the range 208 of noise from the noise source 204 does not overlap with the first position 212 of the remote 132.

In accordance with implementations discussed herein, the various output devices associated with the remote 132 may display an indication of a threshold noise level. The threshold noise level may correspond to a tolerable amount of noise for a certain communication channel between the remote 132 and the receiver 108. In one embodiment, a threshold noise level may be indicated by an LED 142. The LED 142 may be dedicated to a outputting threshold indication in the remote's 132 second mode of operation. In the first mode of operation, the LED 142 may be used for other functions. In this embodiment, the dedicated LED 142 may illuminate and stay illuminated when an amount of noise is detected that exceeds the predetermined threshold. Similarly, if the noise detector 136 detects a level of noise that is below the predetermined threshold amount, the LED 140 may not be illuminated by the remote 132. The threshold LED 140 may be used to test a particular location or range of locations for the remote 132. Specifically, after a noise source 204 has been moved, a user may walk around or otherwise carry the remote 132 along a path which includes various locations which the remote 132 is expected to be located during its normal mode of operation. If, while this search is conducted the threshold LED 142 does not illuminate, a user may determine that the noise source 204 is at a safe distance from the receiver 108 and from the possible locations of the remote 132.

Figure 4:
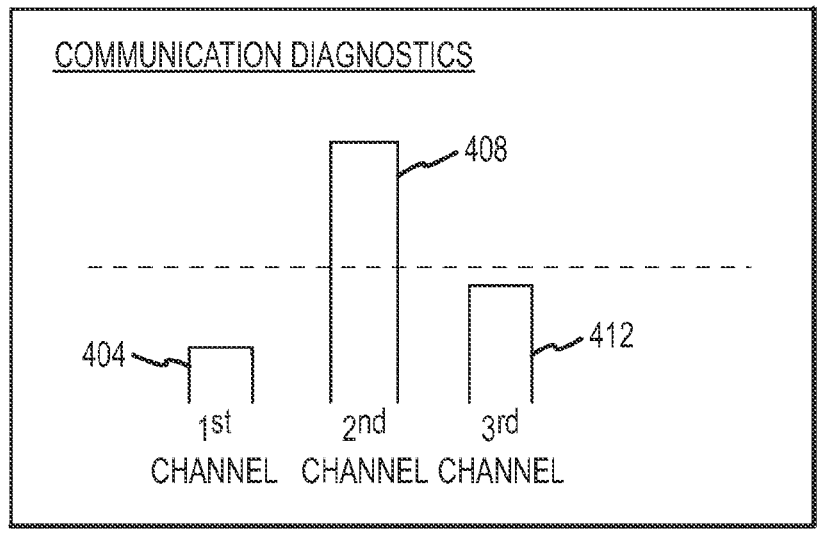
FIG. 4 is a screen shot of a display shown in FIG. 1.

The TV/monitor 124 may additionally be used to display information or other indications of noise detected by the noise detector 136. Specifically, if the detector 136 on the receiver 108 detects an unacceptable level of noise on a particular frequency, the TV/monitor 124 may display a message indicating this situation. Additionally, noise level information may be conveyed through a blinking LED 130 that may be disposed on a front panel of the receiver 108 or through tones emitted from the speaker system 126. FIG. 4 shows a screen shot of the TV/monitor 124 which displays noise information. The screen shot 400 includes a noise level detected on each of the three channels. Specifically, noise level indicator 404 indicates a level of noise on the frequency corresponding to a first channel. Noise level indicator 408 indicates a noise level present on frequencies associated with a second channel, and noise level indicator 412 indicates a level of noise present on frequencies associated with a third channel. The diagnostic information displayed in screen shot 400 may additionally include a threshold indicator 416. Noise levels above the threshold indicator 416 may be considered unacceptable, whereas noise levels below the threshold line 416 may be considered acceptable. As shown in FIG. 4, an acceptable level of noise is present on the first channel and the third channel, whereas an unacceptable level of noise is present on the second channel. It should be appreciated that the levels indicated in screen shot 400 are by way of example and not limitation. Specifically, indications of channel strength rather than channel noise could be displayed on a diagnostic menu. The diagnostic menu may be displayed on screen 124 to provide information to the user regarding the presence of potential noise sources. In certain embodiments, the pattern of noise levels on the available channels may be recorded and saved on the receiver 108. This pattern of noise levels may be recalled or displayed at a future time in connection with diagnostics or procedures to improve the functioning of the remote 132.

Figure 5:
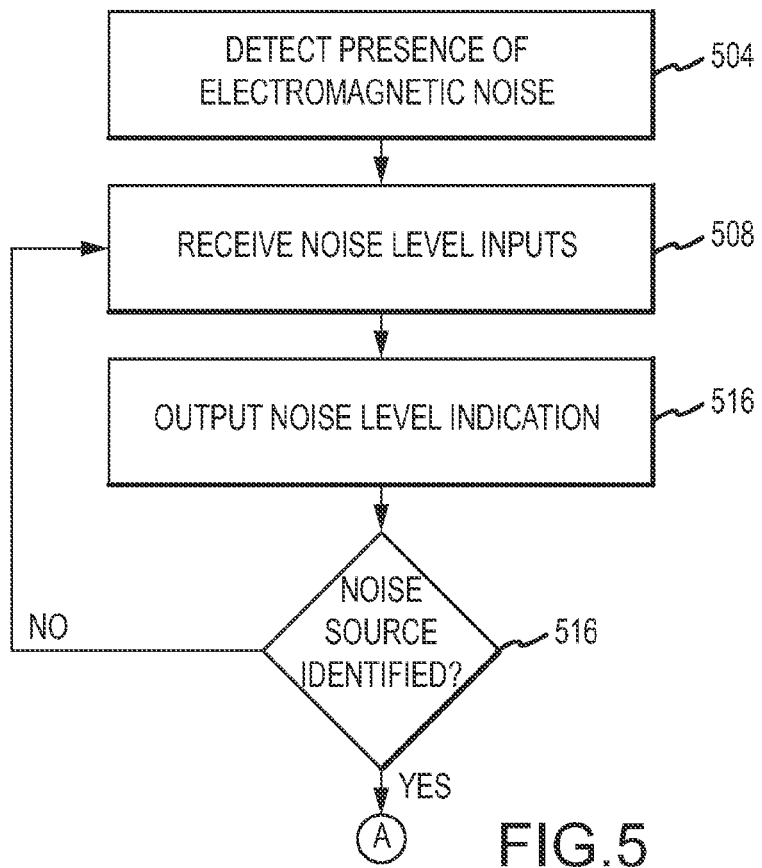
FIG. 5 is a flow chart illustrating a method in accordance with implementations discussed herein.

FIG. 5 is a flow chart illustrating a method in accordance with implementations discussed herein. The method illustrated in FIG. 5 operates to allow a user to identify a noise source. Initially, at operation 504, a noise source is detected. The noise source may be detected through the operation of a noise detector associated with either the receiver 108 or the remote 132. The noise detected in operation 504 may occur on one or more of the channels which make up the communication path between the remote 132 and the receiver 108. Following operation 504, operation 508 may be executed. In operation 508, the remote 132 receives a noise input level measurement from the noise detector 136. Operation 508 may include placing the remote 132 in a diagnostic mode. In certain embodiments, this may include loading a designated firmware set onto the remote 132 from the receiver 108. After the noise level input is received by the detector 136, operation 512 may be executed. In operation 512, an output is provided which indicates a noise level present on one or more communication channels. In connection with the remote 132, output may be provided in the form of a blinking LED 104 or a tone generator 144. The rate of blinking or tone generation may indicate an intensity of noise on one or more communication channels. Following operation 512, operation 516 may follow.

In operation 516, a determination is made as to whether a noise source is identified. Operation 516 may include determining a location of a peak noise level or peak noise intensity that a rate of increase of the rate at which an LED 140 is blinking indicates that the noise source is in proximity to the remote 132. Noise sources may be, for example, cellular telephones, microwave ovens, and so on. If in operation 516, no noise source is identified, operation 508 may be executed following operation 516. As described above, in connection with operation 508, the receiver 108 may continue to receive noise level inputs from the noise detector 136. If, at operation 516 it is determined that the noise source has been identified, the method may end or the user may attempt to mitigate the effect of the noise source.

Figure 6:
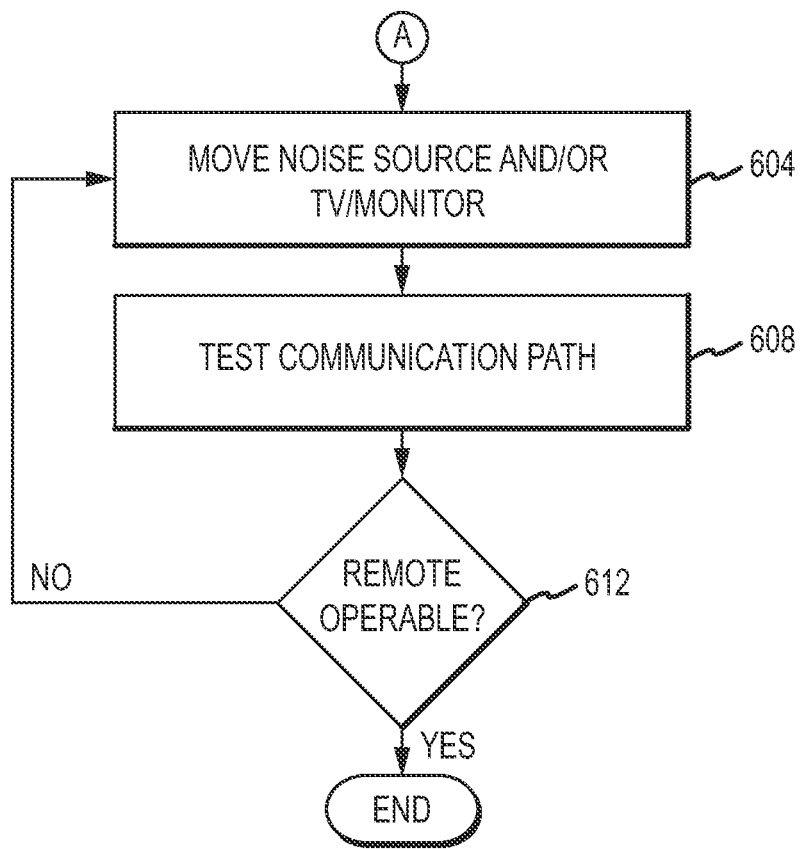
FIG. 6 is a flow chart illustrating another method in accordance with implementations discussed herein.

Following identification of the noise source in 516, a user may determine that the noise source should be moved to a location which does not interfere with the receiver 108 and/or the remote 132. This process is illustrated by the flow chart 600, which is shown in FIG. 6. Operation 604 may follow operation 516, shown in FIG. 5. Initially, at operation 604, the noise source may be moved. In other embodiments, it may be desirable to move the tuner and monitor 124. Specifically, it may be the case that the noise source is not movable. Here, it may be more desirable to move the TV to an alternative location. Following operation 604, operation 608 may be executed.

Once the noise source and the receiver 108 have been separated, the remote 132 may be used to test the communication path in operation 608. Operation 608 may include moving the remote 132 through various locations in the vicinity of the receiver 108. The functionality of the receiver 108 may be tested by continuing to measure noise levels through the operation of the noise detector 136. This may include displaying output on a threshold LED 142, which indicates whether or not an acceptable or unacceptable level of noise is present near the remote 132. Alternatively, the remote 132 may be switched into the first or normal operating mode and the functionality of the remote may then be tested by attempting to enter commands which are conveyed to the receiver 108. Following operation 608, operation 612 may follow. In operation 612, a determination is made as to whether or not the remote is operable. If the remote is not operable, operation 604 may be executed following operation 612. As described above, operation 604 includes moving the noise source 204 with respect to the receiver 108. If, in operation 612, it is determined that the remote is operable, the method may end at operation 616.

In accordance with certain embodiments, two remotes may be used to identify a location of a noise source 204. Specifically, the second remote may include a noise detector 136, amounting to a total of three noise detectors. Specifically, the total system in this embodiment includes a noise detector 136 associated with the receiver 108 and two noise detectors 136, each associated with a respective remote 132. Triangulation techniques may be used by the three noise detectors 136 disposed at three separate locations to pinpoint the location of a noise source 204.

In some embodiments, a single remote may be used to triangulate a noise source. The remote may include functionality for tracking or remembering a position, whether absolute or relative. For example, the remote may include global positioning system (GPS) functionality with the capability to download and store coordinates. (Instead of storing coordinates, the remote may transmit such coordinates to the associated electronic device 108.) Instead of GPS functionality, the remote may be equipped with an ultrasonic, infrared, RF or other type of emitter/receiver that allows it to detect the positions of nearby objects, walls and so forth, typically in conjunction with an accelerometer or other motion sensor. Any such detected object may be used as the basis to establish multiple positions relative thereto. Thus, for example, once an object is detected, the remote may determine a distance to that object for a first position. As the remote is moved, the motion sensor may track changes in angles. When a second position is reached, the remote may again determine the distance to the same object and thus a second position, when combined with the motion sensing data.

Presuming that a position is determined for each signal strength and/or noise reading, once at least three such readings are established then the data may be used to triangulate the location of a noise source in accordance with typical triangulation techniques. Triangulation may be accomplished by the remote itself or the data transmitted to the associated electronic device for computation and/or display.

The foregoing merely illustrates certain principles of embodiments. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the embodiments and are thus within the spirit and scope of the present invention. From the above description and drawings, it will be understood by those of ordinary skill in the art that the particular embodiments shown and described are for purposes of illustration only and are not intended to limit the scope of the present invention. References to details of particular embodiments are not intended to limit the scope of the invention

I claim:

1. A remote control device having a first mode of operation and a second mode of operation, the remote control device comprising:
   a mode detector configured to detect an input from a user placing the remote control in one of the first mode and the second mode;
   a signal transceiver configured, while the remote control is placed in the first mode, to transmit user commands to a content receiver over a wireless channel;
   a noise detection circuit in communication with the signal transceiver, the noise detector circuit being configured to detect and measure an amount of electromagnetic noise in the wireless channel, the noise detection circuit being further configured, when the remote control is placed in the second mode, to output the measured amount of noise; and
   a first output device in communication with the noise detection circuit, the first output device being configured, when the remote control is placed in the second mode, to receive the measured amount of noise from the noise detection circuit and to output information representing the received measured amount of noise, the first output device being further configured, while the remote control device is placed in the first mode, to output information representing a configuration of the remote control.

2. The remote control device of claim 1, wherein:
the first output device comprises a first light emitting diode; and
when the remote control is in the second mode the first light emitting diode blinks at a frequency that corresponds to the received electromagnetic noise, the frequency increases with an increase in the received electromagnetic noise.

3. The remote control device of claim 1, wherein:
the first output device is a tone generator; and
when the remote control is placed in the second mode, the tone generator emits sound at a frequency that corresponds to the received electromagnetic noise.

4. The remote control device of claim 1, wherein the signal transceiver communicates over one of three possible channels.

5. The remote control device of claim 1, further comprising:
a second output device configured to output an indication that a predetermined threshold noise level has been exceeded.

6. The remote control device of claim 5, wherein the second output device is a second light emitting diode, the second light emitting diode configured to provide a constant illumination when the measured amount of electronic noise exceeds the predetermined threshold.

7. A content receiver having a first mode of operation and a second mode of operation, the content receiver comprising:
a mode or configured to detect a user input selecting one of the first mode and the second mode;
a signal transceiver configured to, when the content receiver is placed in the first mode, receive wireless signals that convey user commands from a remote control over a first wireless channel;
a noise detection circuit in communication with the signal transceiver, the noise detector circuit being configured, when the content receiver is placed in the second mode, to detect and measure an amount of electromagnetic noise in the first wireless channel and to output the measured amount of noise;
an output device in communication with the noise detection circuit, the output device being configured, when the content receiver is placed in the second mode, to receive the measured amount of noise from the noise detection circuit and convey information representing the measured amount of noise to the user, the output device being further configured, when the content receiver is placed in the first mode, to output information associated with a program content selected for viewing.

8. The content receiver as claimed in claim 7, further comprising a tuner configured to receive a program content from a service provider, the tuner operatively connected to a processor.

9. The content receiver as claimed in claim 7, wherein:
the output device is a speaker; and
when the content receiver is placed in the second, speaker emits a sound at a frequency that corresponds to the received measured amount of noise, and
when the content receiver is placed in the first mode, the speaker output an audio associated with a selected program content.

10. The content receiver as claimed in claim 7, wherein:
the output device is a display device;
when the content receiver is placed in the first mode, the display device displays a program content received through an operation of a tuner; and
when the content receiver is placed in the second mode, the display device displays information associated with the measure amount of noise.

11. The content receiver as claimed in claim 10, wherein:
the signal transceiver is further configured to communicate with the remote over a plurality of wireless channels;
the noise detection circuit is further configured to detect and measure an amount of electromagnetic noise in the each of the plurality of wireless channels and to output the plurality of measured amounts of noise and
when the content receiver is placed in the second mode, the display device displays a plurality of visual indications of noise level, each visual indication being associated the measured amount of noise in one of the plurality of wireless channels.

12. The content receiver as claimed in claim 10, wherein the display device is configured to display a threshold noise level.

13. A method of mitigating the effect of interference sources in a communication path between a content receiver and a remote control, the method comprising:
detecting a mode selection, the mode selection placing the content receiver in one of a first mode and a second mode;
when placed in the first mode
receiving a first transmission from the remote control over a first wireless channel, the first transmission including a user command, and
outputting a selected program content to a display device; and
when placed in the second mode,
detecting a presence of noise in the first wireless channel,
receiving a plurality of second transmissions from the remote control over the first wireless channel, each second transmission including a noise level measured by the remote control at a particular location, and
outputting the measured noise level included in each second transmission.

14. The method of claim 13, wherein the remote control flashes a light emitting diode at a rate that is proportional to the measured noise level, the rate increases with the an increase in the measured noise level.

15. The method of claim 13, further comprising:
when placed in the second mode, employing at least three of the plurality of second transmissions to triangulate a source of noise.

16. The method of claim 13 further comprising:
when placed in the second mode, transmitting a diagnostic firmware to the remote control over the first wireless communication channel, wherein the remote control executes the diagnostic firmware to measure the noise level.

17. The method of claim 13, wherein the communication path between the content receiver and the remote control includes a plurality of wireless channels, and the method further comprises determining the presence of noise of in at least one of the plurality of the wireless channels.

18. The method of claim 13, wherein the communication path between the content receiver and the remote control includes a plurality of wireless channels, and the method further comprises determining a presence of noise on each of the plurality of channels.

19. The method of claim 13, wherein the communication path between the content receiver and the remote control includes at least three wireless channels, and the method further comprising:

displaying an indication of a noise level in each of the three wireless channels on a television screen associated with the content receiver.

20. The method of claim 13, wherein outputting each of the measured noise levels includes an indication of an acceptable threshold.

* * * * *

UNITED STATES PATENT AND TRADEMARK OFFICE
CERTIFICATE OF CORRECTION

PATENT NO.        : 8,564,398 B2                                       Page 1 of 2
APPLICATION NO.   : 12/511755
DATED             : October 22, 2013
INVENTOR(S)       : Anthony Kozlowski It is certified that error appears in the above-identified patent and that said Letters Patent is hereby corrected as shown below:

In the Claims

Claim 7, Column 11, Line 30:
"a mode or configured to detect a user input selecting one of" should read, --a mode detector configured to detect a user input selecting on of--.

Claim 9, Column 11, Line 57:
"when the content receiver is placed in the second, speaker" should read, --when the content receiver is placed in the second mode, the speaker--.

Claim 9, Column 11, Lines 61-62:
"speaker output an audio associated with the selected program content." should read, --speaker outputs an audio associated with a selected program content.--.

Claim 10, Column 12, Line 3:
"measure amount of noise." should read, --measured amount of noise.--.

Claim 11, Column 12, Lines 8-9:
"and measure an amount of electromagnetic noise in the each of the plurality of wireless channels and to output" should read, --and measure an amount of electromagnetic noise in each of the plurality of wireless channels and to output--.

Claim 11, Column 12, Line 10:
"the plurality of measured amounts of noise and" should read, --the plurality of measured amounts of noise; and--.

Claim 11, Column 12, Lines 13-14:
"of noise level, each visual indication being associated the measured amount of noise in one of the plurality of" should read, --of noise level, each visual indication being associated with the measured Signed and Sealed this
Thirtieth Day of September, 2014

Michelle K. Lee
*Deputy Director of the United States Patent and Trademark Office* amount of noise in one of the plurality of--.

Claim 13, Column 12, Line 25:
"when placed in the first mode" should read, --when placed in the first mode,--.

Claim 17, Column 12, Line 57:
"further comprises determining the presence of noise of in at." should read, --further comprises determining the presence of noise in at.--.